C. CARLTON & C. E. NEWTON.
LIQUID MIXING APPARATUS.
APPLICATION FILED APR. 20, 1911.
1,011,317.
Patented Dec. 12, 1911.
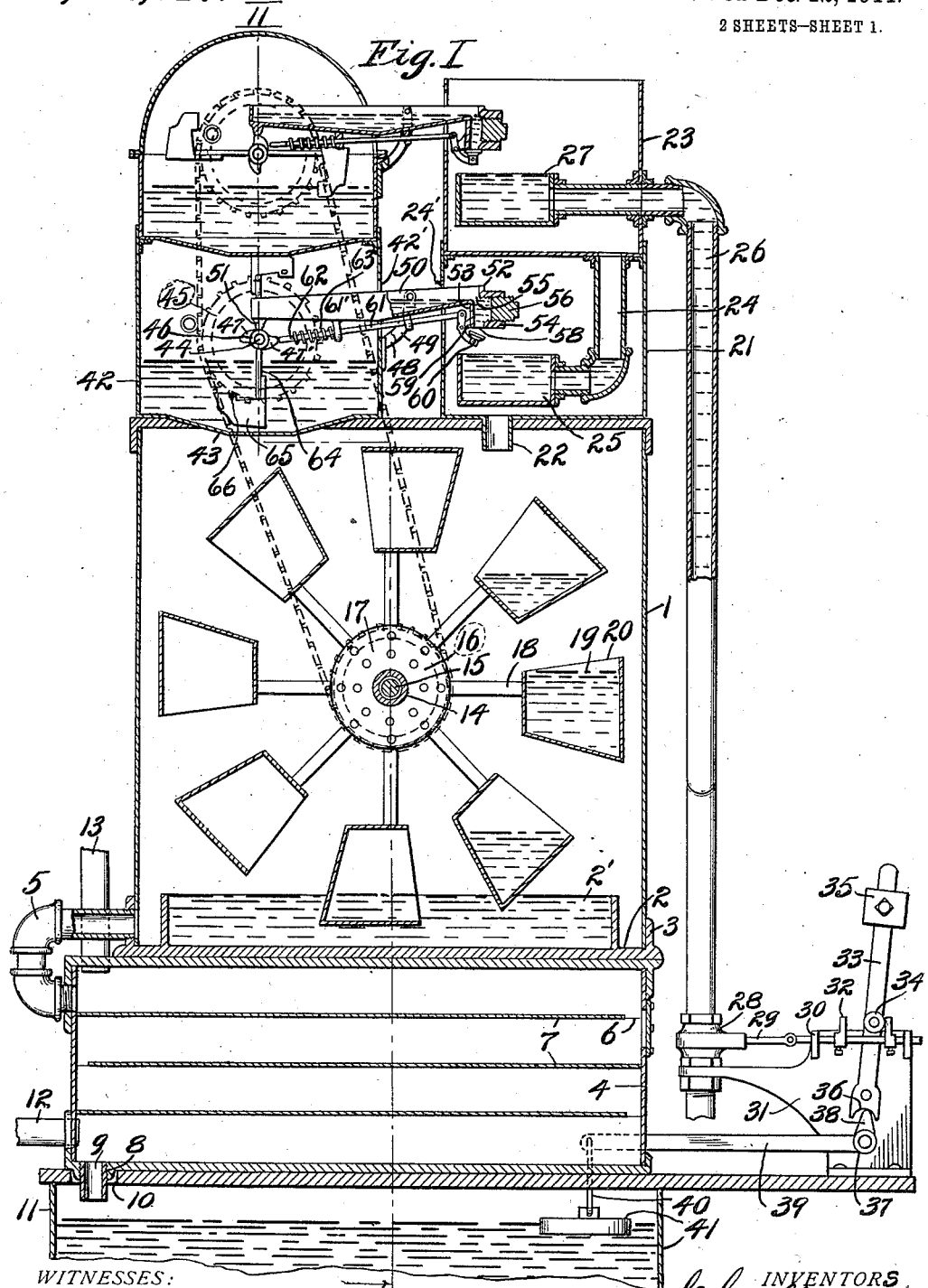

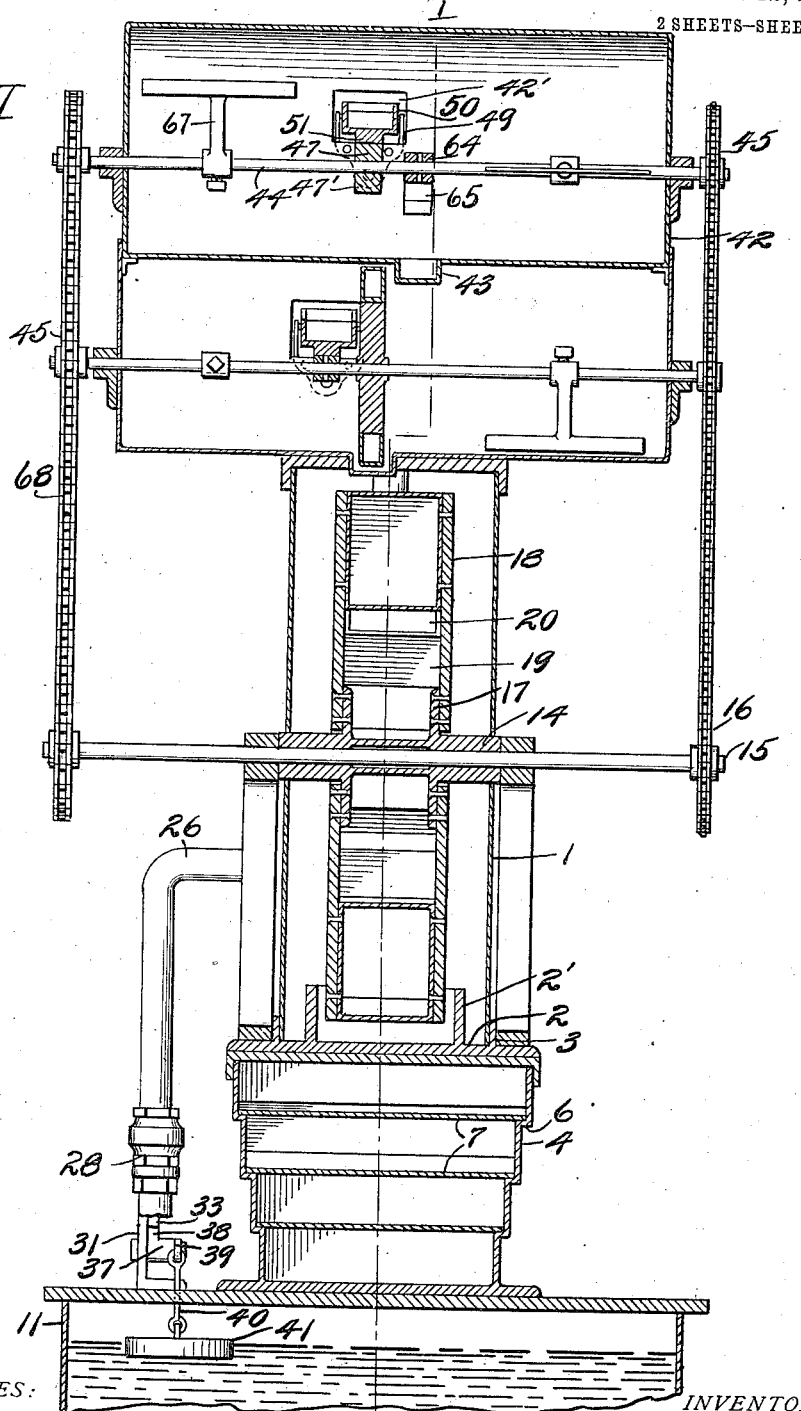

UNITED STATES PATENT OFFICE.

CORTLAND CARLTON AND CARLTON E. NEWTON, OF IOLA, KANSAS.

LIQUID-MIXING APPARATUS.

1,011,317.      Specification of Letters Patent.    Patented Dec. 12, 1911.

Application filed April 20, 1911. Serial No. 622,282.

*To all whom it may concern:*

Be it known that we, CORTLAND CARLTON and CARLTON E. NEWTON, citizens of the United States, residing at Iola, in the county of Allen and State of Kansas, have invented certain new and useful Improvements in Liquid-Mixing Apparatus; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to liquid mixing apparatus and more particularly to an apparatus for mixing measured quantities of suitable coagulants with hard water for the purpose of softening the latter.

One of the principal objects of our present invention is to provide means for supplying the different coagulants to the raw water, at separate stages in its progress from the source of supply.

Another object of the invention is to provide a water wheel for driving the coagulant measuring devices, which is operated by the liquid from the mixers.

It is a further object of our invention to provide a storage tank for receiving the mixed liquid, and means for automatically and instantly stopping the supply of raw water to the mixer when the water in the tank has reached a predetermined level.

Other objects of our invention are to provide improved measuring devices for the coagulants, and means for controlling and actuating same, together with other improved details of structure which will presently be fully described and are illustrated in the accompanying drawings, wherein:—

Figure I is a vertical section of a mixing apparatus constructed according to our invention, taken on the line I—I, Fig. II. Fig. II is an irregular vertical section, on the line II—II, Fig. I.

Referring more in detail to the parts:—1 designates the body of the mixer, which is preferably constructed of sheet metal and supported on a base 2, having edge flanges 3 to which the lower portion of the body may be attached, and having a pan 2' within the body and spaced from the sides thereof. We prefer to mount the base 2 on a heater, comprising a casing 4, the upper part of which is in communication with the lower part of the mixer body 1, through a pipe 5. The sides of casing 4 are provided with shoulders 6, at vertical intervals, and loosely seated on said shoulders are plates 7, which are shorter than the interior length of the casing and are set in from the ends of the casing in alternating arrangement, to form a tortuous path for the steam and water that is passed therethrough. In the bottom of the casing, at the end of the tortuous path, is an opening 8, having a tube 9 fixed therein and projected through an opening 10 in the top of a well or tank 11, upon which the casing may be supported. Opening into the lower portion of the casing 4, at the end of the tortuous path and adjacent to the discharge tube 10, is a steam pipe 12, and opening from the top of the casing, at the end of the path, is an exhaust pipe 13.

Journaled in the sides and extending through the interior of body 1, is a shaft sleeve 14. Fixed within said sleeve is a shaft 15, the ends of which project from opposite sides of the body and carry sprocket wheels 16. Fixed to the central portion of the sleeve 14 are annular flanges 17, which carry the radial arms 18. Arms 18 are arranged in pairs, and fixed between the outer ends of the members of each pair is a bucket 19 having a mouth 20 in one side. The arms and buckets are of such length that the buckets will project into the pan 2' at the bottom of the body and act as stirrers, as will be hereafter more fully explained.

Mounted on the top of body 1 is a mixing chamber 21, having a pipe 22 in its bottom adapted for delivering liquid into the buckets 19, at one side of the center of the wheel. Mounted on chamber 21 is a second chamber 23, having a pipe 24 opening from its bottom portion into chamber 21 and turned laterally near the bottom of the lower chamber. Pipe 24 carries a pan 25 at its lower end, with which it communicates, so that liquid delivered from the upper chamber will be conducted through the pipe to pan 25 and may overflow therefrom into the chamber.

Extending into the upper chamber 23 is a raw water supply pipe 26, which carriers a pan 27 similar to the pan 25 in the lower chamber. In the raw water supply pipe is a valve 28, having a laterally directed rod 29, that is slidably projected through a pair of lugs 30 on a standard 31. Adjustably fixed to rod 29, between the lugs, are posts 32.

Pivoted to standard 31 is an arm 33, which projects between the standard and rod 29 and has a laterally directed boss 34, which is adapted for engagement with either of the posts 32, according to its position. Adjustably mounted on the upper end of the arm is a weight 35, and in the lower end of the arm is a curved socket 36. Pivotally mounted on the standard, below the arm 33, is a lever 37, having a nose 38 projected into the socket 36, and an arm 39 projected over the storage tank 11. Depending from arm 39 is a rod 40 which extends into the tank and carries a float 41.

With the valve in the supply pipe controlled by the mechanism described, the flow of raw water to the mixer is instantly and entirely shut off when the water in the storage tank reaches a predetermined level. The instant stoppage of the flow of raw water is of considerable importance for the reason that, with a slowly closing valve, the flow to the wheel is gradually diminished so that the wheel stops until one of the buckets is filled, and then turns rapidly to empty the bucket and the impetus of the wheel carries it through the pan 2′ and part way up on the other side, causing several buckets to pass the intake point without receiving liquid. As the coagulant supply is governed by the turning of the main wheel, as will presently be described, it is apparent that, with a slow closing valve, there is a period when the full supply of coagulant would be delivered for a much diminished quantity of raw water. With the quick closing valve, this disadvantage is obviated, as the supply of raw water is cut off instantly, and the water wheel is stopped with the discontinuance of its supply.

Located at the side of, but preferably spaced from the chamber 21 is a tank 42, having a downset well 43, in its bottom. Journaled in the sides of and extending through tank 42, is a shaft 44. Fixed to the shaft, on the outside of the tank, is a sprocket 45, and fixed to said shaft within the tank is a cam 46, having oppositely disposed heads 47—47′. Fixed to the side of tank 42 is a bracket 48, having yoke arms 49. Pivotally mounted in yoke arms 49 is a trough 50, one end of which projects through an opening 42′ in the tank 42 and has a boss 51 on its under face adapted for engagement by the cam heads on shaft 44. The other end of the trough extends through an opening 24′ in chamber 24, and terminates over the mixing pan 25 in a cup 52. Cup 52 is preferably formed by inclining the bottom of the trough upwardly toward the mixer end and thence downwardly to form the cup side 53, and forming an extension 54 on the outer end of the trough, the upper edge of the trough being turned downwardly to form the cup mouth 55. The extension 54 may be provided with a plug 56, for varying the area of the cup chamber, and has a delivery port 58 in its bottom. Pivotally mounted on the trough is an arm 59, having a valve head 60 adapted for closing the port 58, or for exposing same, to deliver the liquid. Pivotally connected with arm 59 is a rod 61 which is slidably extended through eyes 61′ on the under side of the trough and projects into the path of the cam 46. Coiled on rod 61 and held against the outer eye 61′, by a pin 62, is a spring 63, which normally yieldingly pushes the rod toward the cam and holds the valve against the cup port to prevent the escape of liquid from the cup. Also fixed on shaft 44 are arms 64 which carry buckets 65 on their outer ends that are adapted to drop into the well 43 in the bottom of the tank and take up liquid therefrom. The arms 64 are located adjacent to the trough 50, and the buckets 65 have openings 66 in their free ends, through which the liquid is discharged laterally into the trough when the buckets are at the upper limit of their travel. Also fixed on shaft 44 are stirrer blades 67 which are adapted for agitating the coagulant in the tank.

Mounted on the top of tank 42 is a second tank which is supplied with a trough, dippers, etc., identical in construction and operation with the one just described, except that the trough in the upper tank projects into the upper mixing chamber 23. As the parts are identical, we will not describe same in detail, but refer to them by reference numerals corresponding to the numerals on the lower tank and trough parts.

Running over the sprocket 16 on the overshot wheel shaft 15, and over both of said sprockets 45, is a chain belt 68, whereby the shafts 44 are revoluble when the overshot wheel is in operation.

Presuming the parts to be assembled as described, and the upper tank 42 provided with a suitable lime water solution, and the lower tank 42 with a soda-ash solution, which are the coagulants usually used for softening water, the operation of the apparatus is as follows:—The raw water supply pipe being open, water is fed through pipe 26 into the pan 27 in the upper mixing chamber and overflows therefrom and is passed downwardly through the pipe 24, to the pan in the lower mixing chamber, from which it overflows and is discharged through the pipe 22 into the buckets on the overshot water wheel, causing the wheel to revolve and operate the shafts 44 in the coagulant solution tanks. Upon the operation of the shafts 44, the dippers are revolved within the tanks and take up the liquid solution, and during the part of the revolution above the level of the troughs, discharge the liquid into the troughs. A further revolution of the shafts 44 will bring the cams 47 into contact with the lugs 55 on the under sides of the troughs and tip the troughs on their bearings, to cause the solution to flow into the cups which are carried on the ends of the troughs, within the mixing tanks. When the cams leave the contacts with the dogs, the troughs will swing back to their first positions, but the liquid delivered to the cups will be held therein. After leaving the contact with the dogs, the cams engage the ends of the valve rods 61 and rock same to move the valve heads away from the cup ports, so that the liquid from the cups may be delivered into the mixing pans. A continued revolution of the cams frees the rods, so that the latter are moved back by the tension of springs 63, and the cup ports again closed. If desired the cams can be arranged so that the troughs will act alternately, although such arrangement is not essential. With the overshot wheel in operation and the raw water being supplied to the upper mixing pan, the overshot wheel will produce a continued actuation of both of the coagulant troughs, so that measured quantities of solution are delivered into the pans, to overflow with the raw water and become mixed therewith during such overflow and during the travel of the mixture from one chamber to the other and from the last chamber into the wheel buckets, the separate delivery of the different coagulants producing better results than if the two solutions were mixed simultaneously with the raw water. During the operation of the wheel, the buckets 19 pass continuously through the pan 2' and deliver their contents thereto; the revolution of the buckets through the liquid in the pan serving to stir same, so that the mixing is continued. During the operation of the apparatus the liquid flows over the edge of pan 2' into the delivery channel between same and the body of the apparatus, and escapes through the pipe 5 into the heating chamber, where it travels in a circuitous path to the outlet 9, through which it is delivered into a storage tank. Simultaneously with the downward travel of water through the heater, a volume of steam is traveling upwardly therethrough, from the intake pipe 12 to the exhaust 13, so that the softened water is heated when delivered into the storage tank. When the water in the storage tank reaches the proper level, it lifts the float 41, which in turn rocks the lever 47, turning the ear 38 in the socket in the pivoted arm 33 until the arm passes over a center, when the weight throws the arm suddenly against one of the dogs 32 and closes the valve 28 to shut off the supply of water.

With this apparatus the flow is closed instantly so that the entire supply of water is shut off, and as soon as the buckets in the overshot wheel have emptied, the entire apparatus will become inoperative. As soon as sufficient water has been taken out of the storage tank to lower the float, the weight arm is thrown to its opposite extremity and opens the valve in the supply pipe.

It is apparent that with an apparatus constructed according to our invention, measured quantities of coagulant may be automatically delivered to the raw water at different operations, and that the supply of coagulant is discontinued with the supply of raw water, so that uniformly treated water will result.

Having thus described our invention, what we claim as new therein and desire to secure by Letters-Patent is:—

1. A liquid mixing apparatus comprising a train of mixing pans, means for supplying raw water to one of said pans, a wheel actuated by the overflow from said pans, and means controlled by said wheel for delivering solution to said pans.

2. A liquid mixing apparatus comprising a mixing pan, means for delivering solution to said pan in measured quantities, a conduit for delivering raw water to said pan, a storage tank, a float in said tank, and means actuated by said float for instantly closing or opening said conduit.

3. A liquid mixing apparatus comprising a plurality of mixing pans, means for supplying raw water to one of said pans, a separate solution chamber for each of said pans, means for delivering solution from said chambers to said pans, a water wheel adapted for actuation by overflow from said pans, and means for actuating said solution delivery means from said water wheel.

4. A liquid mixing apparatus comprising a mixing pan, a conduit for delivering raw water to said mixing pan, a second mixing pan located below said first named pan and adapted for receiving overflow therefrom, a separate solution chamber for each of said mixing pans, and means for delivering solution from each of said chambers to a relative mixing pan independently of the others.

5. In a liquid mixing apparatus, an inclosed body portion, a water wheel revolubly mounted in said body portion, mixing apparatus located above the water wheel, separate means for delivering raw water and solution to said mixing apparatus, said water wheel being adapted for actuation by overflow from the mixing apparatus a storage tank adapted for receiving liquid from said inclosed body member, and means for automatically and instantly shutting off the supply of raw water when the liquid in said storage tank has reached a predetermined level.

6. In a liquid mixing apparatus, the combination with an inclosed body member, of mixing apparatus located above the body member and adapted for overflow thereinto, a conduit for supplying raw water to the mixing apparatus, water wheel in said body member adapted for actuation by overflow from the mixing apparatus, means actuated by said water wheel for delivering solution to said mixing apparatus, a storage tank located below the body member, and a heater interposed between the body member and storage tank, through which liquid from the body member is passed to the storage tank, and a steam pipe opening into the bottom of said heater.

7. In a liquid mixing apparatus, the combination with a water wheel having radially arranged buckets and having an extended shaft, of a mixing chamber located above the wheel and adapted for delivering liquid to said buckets, a pan located in said chamber, a mixing chamber located above said first named chamber and adapted for delivering liquid to said pan, a mixing pan located in said last named chamber, a conduit for delivering raw water to said upper pan, a valve for controlling the flow of raw water in said conduit, a separate solution tank for each mixing chamber, pivotally mounted troughs, each having one end projected into a mixing chamber and the opposite end into a solution tank, means for delivering solution from said tanks into said troughs, and means for rocking said troughs to deliver solution therefrom into the mixing pans, said trough actuating means being operative from the water wheel.

8. In a liquid mixing apparatus, the combination of a mixing chamber, a solution tank having a revoluble shaft therein, a pivotally mounted trough having a weight arm projected into said tank over said shaft, and its opposite end located within the mixing chamber, a cam on said shaft adapted for rocking said trough, and a valve adapted for controlling delivery from said trough and for actuation by said cam.

9. In a liquid mixing apparatus, the combination with a suitable mixing chamber, of a solution tank, a shaft extending through said solution tank, a pivotally mounted trough having a weight arm projected over said shaft within said tank and having its opposite end located within said mixing chamber and provided with a bucket having an outlet port adapted for delivery into said chamber, a valve for controlling the cup outlet and having an extended rod, a cam on said shaft adapted for actuating said trough and said rod, and means controlled by overflow from the mixing chamber for actuating said shaft.

10. In a liquid mixing apparatus, the combination with a suitable mixing chamber, of a solution tank, a shaft extending through said solution tank, a pivotally mounted trough having a weight arm projected over said shaft within said tank and having its opposite end located within said mixing chamber and provided with a bucket having an outlet port adapted for delivery into said chamber, a valve for controlling the cup outlet and having an extended rod, a cam on said shaft adapted for successively actuating said trough and said rod, and means controlled by overflow from the mixing chamber for actuating said shaft.

11. In a liquid mixing apparatus, the combination with a suitable mixing chamber, of a solution tank, a shaft extending through said solution tank, a pivotally mounted trough having a weight arm projected over said shaft within said tank and having its opposite end located within said mixing chamber and provided with a bucket having an outlet port adapted for delivery into said chamber, a valve for controlling the cup outlet and having an extended rod, dippers on said shaft adapted for delivering solution to said trough, a cam on said shaft adapted for actuating said trough and said rod, and means controlled by overflow from the mixing chamber for actuating said shaft.

12. In a liquid mixing apparatus, the combination with a suitable mixing chamber, of a solution tank having a down set well in its bottom, a trough having one end located in the solution tank and the opposite end within the mixing chamber, the end within the mixing chamber being provided with a cup having a port in its lower portion, a valve for controlling said port, means for yieldingly retaining said valve in closed position, a dipper for delivering solution from said tank into said trough, and means controlled by overflow from said mixing chamber for rocking said trough and actuating said valve and said dipper.

13. In a liquid mixing apparatus, the combination with a water wheel having radially arranged buckets, of a mixing apparatus adapted for delivering liquid to said buckets, a solution tank, a shaft located within said solution tank and provided with a belt wheel, a pivotally mounted trough adapted for receiving solution from the tank and delivering same to said chamber, operative connection between the water wheel and said shaft, a storage tank for receiving the liquid passing over said wheel, a float within said tank, a conduit for delivering raw water to the mixing chamber, a valve in said conduit having an extended rod provided with spaced tongues, a pivotally mounted arm having a weighted end, and an opposite socketed end, said arm having means for engaging said tongues, and a lever connected with said float and having a nose engaging the socketed part of said arm, for the purpose set forth.

In testimony whereof we affix our signatures in presence of two witnesses.

CORTLAND CARLTON.
CARLTON E. NEWTON.

Witnesses:
ALTES H. CAMPBELL,
ASA N. MITCHELL.

Copies of this patent may be obtained for five cents each, by addressing the "Commissioner of Patents, Washington, D. C."